United States Patent [19]

Puckett

[11] 4,301,012

[45] Nov. 17, 1981

[54] WELDED STAINLESS STEEL MESH CLEANABLE FILTER

[75] Inventor: Donald M. Puckett, Thousand Oaks, Calif.

[73] Assignee: Purolator Technologies, Inc., Newbury Park, Calif.

[21] Appl. No.: 33,031

[22] Filed: Apr. 25, 1979

[51] Int. Cl.³ .......................................... B01D 27/06
[52] U.S. Cl. ............................... 210/457; 210/493.1; 55/497; 55/521
[58] Field of Search ............... 210/493 B, 493 M, 457, 210/350, 499; 55/521, 497–499

[56] References Cited

U.S. PATENT DOCUMENTS

| | | | |
|---|---|---|---|
| 3,042,571 | 7/1962 | Jackson | 210/493 B |
| 3,334,753 | 8/1967 | Royer et al. | 210/457 |
| 3,458,050 | 7/1969 | Cooper | 210/457 |
| 3,486,626 | 12/1969 | Close | 55/521 |
| 3,591,010 | 7/1971 | Pall | 210/499 |
| 3,662,895 | 5/1972 | Tuffnell | 210/493 M |
| 3,716,970 | 2/1973 | Stupf et al. | 55/521 |

*Primary Examiner*—Benoit Castel
*Attorney, Agent, or Firm*—Gordon L. Peterson

[57] ABSTRACT

A filter comprising a center tube and a porous metal filter pack surrounding the center tube. The filter pack has a plurality of pleats extending longitudinally of the center tube with each of the plates having first and second ends. A metal-to-metal bond seals the first and second ends of the pleats closed. An additional metal-to-metal bond attaches the filter pack to the center tube and seals the filter pack to the center tube. The conventional filter end caps are eliminated to reduce entrapment of debris at the ends of the filter pack and to facilitate cleaning of the filter.

9 Claims, 4 Drawing Figures

WELDED STAINLESS STEEL MESH CLEANABLE FILTER

BACKGROUND OF THE INVENTION

This invention relates to a filter of the type which includes a pleated, porous metal filter pack. Filters of this kind typically include a center tube, a pleated metal filter pack wrapped around and affixed to the center tube, and end caps at the opposite ends of the filter pack.

The end caps can be attached to the center tube and/or the pleated filter pack in different ways. For example, the end caps may be attached by a slug of solder or braze material which may completely encapsulate the ends of the filter pack. The end caps seal the ends of the pleats.

One problem with end caps is that they close and obstruct the spaces between the pleats, and in so doing, form a chamber in which debris can be trapped. This can shorten the useful life of a disposable filter and hasten the time when cleaning of a reusable filter is required. In addition, end caps make cleaning of the filter more difficult in that it is hard to remove the debris from the chambers formed by the end caps.

SUMMARY OF THE INVENTION

This invention solves the problems noted above by eliminating the end caps of the prior art. With this invention, the ends of the pleats are sealed closed by a metal-to-metal bond. With this construction, the ends of the pleats are spaced apart, and these spaces or gaps are uncovered and unobstructed axially and radially outwardly of the filter pack so that entrapment of debris in such spaces is reduced. Thus, the filter can be used longer before cleaning is required. Moreover, because the spaces between the ends of the pleats are open and uncovered, cleaning of the filter is materially facilitated.

The metal-to-metal bond can be provided in different ways, such as by welding, brazing or soldering. Whatever technique is used, it must be compatible with the metal of the filter pack. If welding is used, weld material, such as from a filler rod, may be added to form the metal-to-metal bond or the metal-to-metal bond can be provided by fusing the metal of the pleat ends together. For example, for a stainless steel wire mesh filter pack, a suitable metal-to-metal bond which involves the addition of weld material can be provided by tungsten inert gas welding or resistance welding can be used to fuse together the parent metal of the pleat ends.

The metal-to-metal bond eliminates the need for the conventional end caps and seals the ends of the pleats against liquid flow through the pleat ends. A metal-to-metal bond is stronger than an adhesive and it is adapted to be obtained without pinching together the ends of the layers of porous metal forming the pleats. If the layers of porous metal forming a pleat were pinched together, the metal of the filter pack may be distorted to such an extent that the filter would not pass the usual bubble test. The metal-to-metal bond along the opposite ends of the pleats also provides rigid mounting or positioning splines for the pleats of the filter pack.

The filter pack can be used in a filter which includes a center tube. In this event, the filter pack is generally tubular and either inserted into, or wrapped around, the center tube. In either case, the filter pack should be joined to the center tube. This joining function can advantageously be carried out by a metal-to-metal bond. In a preferred construction, a portion of the center tube projects axially beyond the ends of the pleats, and the filter pack is attached by weld material to such portion of the center tube. Fingers of weld material extend radially from the ring of weld material to close the pleat ends. Thus, in a single welding operation, the pleat ends are sealed and mounted, and the filter pack is attached to, and sealed to, the center tube.

The invention, together with further features and advantages thereof, may best be understood by reference to the following description taken in connection with the accompanying illustrative drawing.

DESCRIPTION OF THE PREFERRED EMBODIMENT

Figure 1:
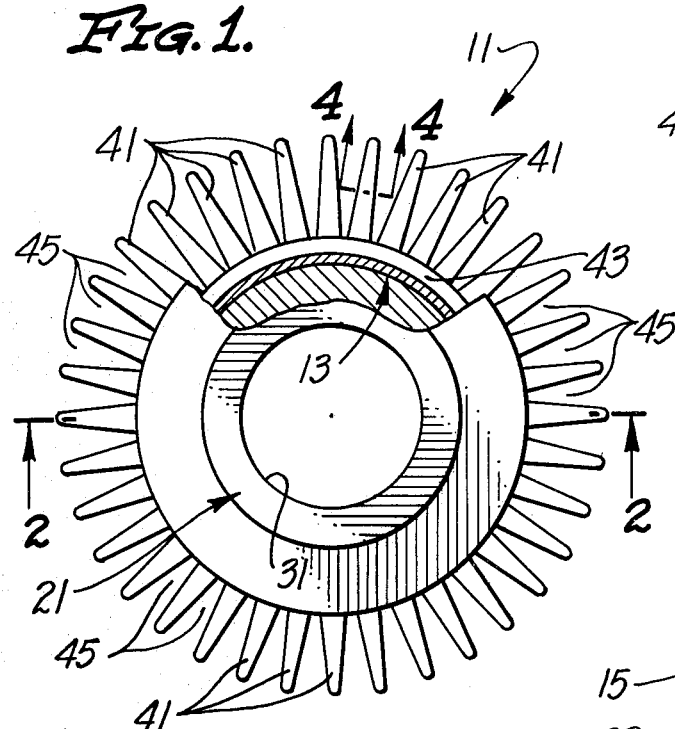
FIG. 1 is a top plan view of a filter constructed in accordance with the teachings of this invention with portions broken away to expose the metal-to-metal bond.
Figure 2:
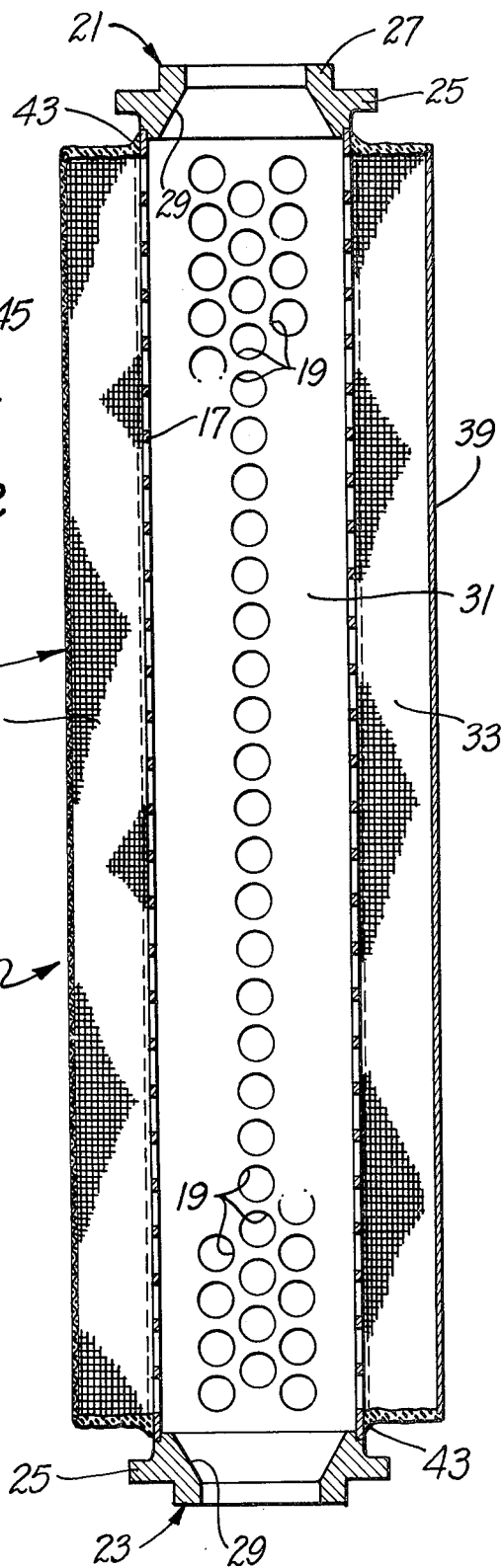
FIG. 2 is a longitudinal sectional view taken generally along line 2—2 of FIG. 1.

FIGS. 1 and 2 show a filter 11 which can be used to filter various fluids, including liquid chemicals used in the manufacture of photographic paper. The filter 11 generally includes the center tube 13 and a filter pack 15. The center tube 13 includes a cylindrical, peripheral wall 17 constructed of a suitable metal, such as stainless steel and a plurality of radial holes or ports 19 spread evenly throughout the peripheral wall. Identical fittings or end portions 21 and 23 are welded or otherwise secured to the cylindrical wall 17 and form extensions of the center tube 13. The fittings 21 and 23 are used to attach the filter 11 to external structure. Each of the fittings includes a peripheral flange 25, an annular boss 27 and a frusto-conical interior surface 29. A flow passage 31 extends axially completely through the center tube 13 and the fittings 21 and 23. The radial ports provide communication between the flow passage 31 and the exterior of the center tube 13.

The filter pack 15 is constructed of porous metal. In the embodiment illustrated, the filter pack is constructed of stainless steel wire mesh material. The mesh size of the stainless steel mesh can vary depending upon the filtering requirements for the filter.

Figure 3:
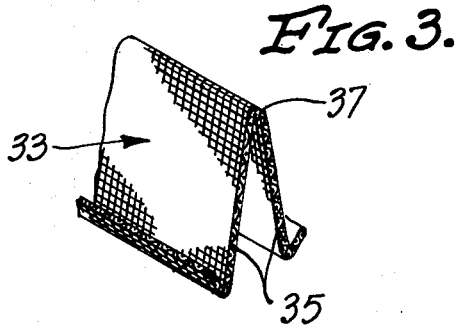
FIG. 3 is a fragmentary perspective view showing one of the pleat ends with the weld material removed.
Figure 4:
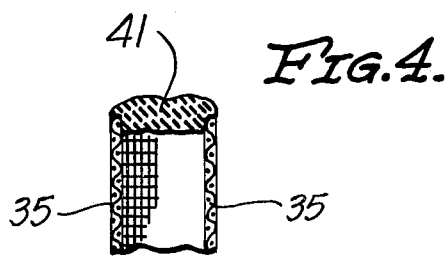
FIG. 4 is an enlarged sectional view taken generally along line 4—4 of FIG. 1 and showing an end portion of one of the pleats of the filter pack.

The filter pack 15 is formed into a plurality of axially extending pleats 33, with each of the pleats extending the full length of the filter pack. The number and size of the pleats 33 can be selected in accordance with known practice depending upon the required filtering area. As shown in FIGS. 3 and 4, each of the pleats is made up of two layers 35 of wire mesh material interconnected by a fold 37 at the radial outer end of the pleat. The layers 35 may be spaced apart over all, or major portions of, their surface area. In the embodiment illustrated, the layers 35 are spaced apart as shown in FIGS. 3 and 4.

The filter pack 15 is in the form of an annulus which completely surrounds the center tube 13; however, for radial outward flow, the filter pack would be inserted into the center tube. In making the filter pack 15, the wire mesh material may be welded together longitudinally along a longitudinal seam 39 (FIG. 2) to form the wire mesh material into the generally elongated annular envelope shown.

In use, the filter 11 is placed in a fluid flow path for fluid to be filtered. The fluid may flow in either direction through the filter. For example, the fluid can flow radially inwardly through the filter pack 15 and the ports 19 to the flow passage 31. In order to assure that all of the fluid in the flow path passes through the filter pack 15 and into the flow passage 31, it is necessary to seal and close the opposite ends of each of the pleats 33. This is accomplished by a metal-to-metal bond, such as weld material 41, which is arranged to form a plurality of generally radially extending fingers as shown in FIG. 1, each of which extends along one end of one of the pleats 33. Each of these radial fingers is rigid and, therefore, tends to mount and fix the opposite ends of each of the pleats 33. The weld material 41 completely closes and seals the ends of each of the pleats 33 against the passage of fluid therethrough. As shown in FIG. 4, the weld material fills in the space between the layers 35 at the end of the pleat, and there is no need to deform the wire mesh together at the end of the pleat 33 in order to effect closure and sealing of the pleat ends.

A metal-to-metal bond, which may be a ring of weld material 43 at each end of the filter pack, is used to attach the filter pack to the center tube 13 and to seal the interface between the filter pack and the center tube at the opposite ends of the filter pack. Preferably, the weld material 43 is continuous with, and integral with, the weld material 41. As shown in FIG. 2, the opposite end portions of the center tube 13 extend axially beyond the ends of the filter pack 15, and the weld material 43 extends from the weld material 41 to the extending or projecting portions of the center tube 13.

With this construction, the ends of the pleats 33 and the fingers of weld material 41 are spaced apart circumferentially by circumferential spaces or gaps 45 (FIG. 1). These gaps 45 are uncovered and unobstructed in the axial direction and in a direction radially outwardly of the center tube 13. Thus, the gaps 45 are open axially and radially outwardly, and they do not tend to trap debris. Moreover, because the gaps are open axially and radially outwardly, cleaning of the filter 11 is materially facilitated.

Although an exemplary embodiment of the invention has been shown and described, many changes, modifications and substitutions may be made by one having ordinary skill in the art without necessarily departing from the spirit and scope of this invention.

I claim:

1. A filter for filtering a fluid comprising:
a center tube having an axially extending flow passage and radial ports providing communication between the flow passage and the exterior of the center tube;
a porous metal filter pack arranged in a generally tubular configuration adjacent said center tube, one of said center tube and said filter pack being within the other of said center tube and said filter pack;
means for attaching the filter pack to the center tube;
said filter pack having a plurality of pleats extending along the center tube, each of said pleats having first and second opposite ends, said ends being spaced axially;
a metal-to-metal bond for sealing said first ends and said second ends of said pleats closed; and
said first ends of said pleats being spaced from each other and said second ends of said pleats being spaced from each other with such spaces being uncovered axially of the filter pack whereby entrapment of debris in such spaces is reduced and
the fluid to be filtered can flow through the filter pack, the radial ports and the flow passage.

2. A filter as defined in claim 1 wherein at least some of said pleats are formed by two layers of porous metal, the layers forming at least some of said pleats being spaced apart at said first ends, said metal-to-metal bond including weld material filling such spaces between such layers whereby said layers are sealed closed without locally deforming the layers at the first ends toward each other.

3. A filter as defined in claim 1 wherein said center tube is constructed of metal and said attaching means includes a metal-to-metal bond for attaching the filter pack to said center tube and for sealing the filter pack to the center tube.

4. A filter as defined in claim 1 wherein a portion of said center tube projects axially beyond said first ends of said pleats and said attaching means includes a continuous ring of weld material extending around said portion of said center tube and attaching the filter pack to the center tube, said metal-to-metal bond includes fingers of weld material extending radially of said ring of weld material.

5. A filter as defined in claim 4 wherein said center tube is within said filter pack and said fingers of weld material extend radially outwardly of said ring of weld material.

6. A filter as defined in claim 1 wherein said metal filter pack includes stainless steel wire mesh material formed into said pleats.

7. A filter as defined in claim 1 wherein said metal-to-metal bond includes weld material for sealing said second ends of said pleats' closed said metal filter pack includes stainless steel wire mesh material formed into said pleats, a portion of said center tube projects axially beyond said second ends of said pleats, said attaching means includes a continuous ring of weld material around said portion of said center tube and extending from said portion of said center tube to the weld material which seals the second ends of the pleats whereby said continuous ring of weld material attaches the filter pack to the center tube, said weld material at said second ends of said pleats being relatively rigid.

8. A filter for filtering a fluid comprising:
means defining a fluid flow path for fluid to be filtered;
a porous metal filter pack in said flow path;
said filter pack having a plurality of pleats disposed in said flow path to increase the filtering area of the filter pack in said path, each of said pleats having first and second opposite ends;
a metal-to-metal bond sealing said first ends and said second ends of said pleats closed; and
said first ends of pleats being spaced from each other and said second ends of said pleats being spaced from each other with such spaces being uncovered axially of the filter pack whereby entrapment of debris in such spaces is reduced.

9. A filter as defined in claim 8 wherein at least some of said pleats are formed by two layers of porous metal, the layers forming at least some of said pleats being spaced apart at said first ends, said metal-to-metal bond including weld material filling such spaces between such layers whereby said layers are sealed closed without locally deforming the layers at the first ends toward each other.

* * * * *